(12) United States Patent
Belenky

(10) Patent No.: US 9,871,651 B2
(45) Date of Patent: Jan. 16, 2018

(54) DIFFERENTIAL POWER ANALYSIS COUNTERMEASURES

(71) Applicant: Cisco Technology, Inc., San Jose, CA (US)

(72) Inventor: Yaacov Belenky, Maaleh Adumim (IL)

(73) Assignee: Cisco Technology, Inc., San Jose, CA (US)

( * ) Notice: Subject to any disclaimer, the term of this patent is extended or adjusted under 35 U.S.C. 154(b) by 459 days.

(21) Appl. No.: 14/607,137

(22) Filed: Jan. 28, 2015

(65) Prior Publication Data

US 2015/0365228 A1    Dec. 17, 2015

(30) Foreign Application Priority Data

Jun. 16, 2014    (IL) .......................... 233164

(51) Int. Cl.
*H04L 9/00* (2006.01)

(52) U.S. Cl.
CPC .......... *H04L 9/003* (2013.01); *H04L 2209/08* (2013.01)

(58) Field of Classification Search
CPC ........ H04L 9/003; H04L 2209/08; G06F 1/30
See application file for complete search history.

(56) References Cited

U.S. PATENT DOCUMENTS

| | | | |
|---|---|---|---|
| 6,654,884 B2 | 11/2003 | Jaffe et al. | |
| 8,522,052 B1 | 8/2013 | Lesea | |
| 8,892,903 B1 * | 11/2014 | Trimberger | G06F 21/558 713/189 |
| 9,531,384 B1 * | 12/2016 | Morrison | H03K 19/0019 |
| 2002/0172357 A1 * | 11/2002 | Pham | H04K 1/02 380/37 |
| 2003/0048903 A1 | 3/2003 | Ito et al. | |
| 2005/0232430 A1 * | 10/2005 | Gebotys | H04L 9/003 380/286 |
| 2009/0092245 A1 * | 4/2009 | Fumaroli | G06F 7/723 380/28 |
| 2013/0173928 A1 | 7/2013 | Kocher et al. | |
| 2016/0277180 A1 * | 9/2016 | Wang | G09C 1/00 |

OTHER PUBLICATIONS

Akkar, Mehdi-Laurent et al, "A Generic Protection against High-Order Differential Power Analysis", in Fast Software Encryption: Lecture Notes in Computer Science vol. 2887, 2003, pp. 192-205.

(Continued)

*Primary Examiner* — Baotran N To
(74) *Attorney, Agent, or Firm* — Samuel M. Katz

(57) ABSTRACT

An electronic device includes a plurality of logic units, which have respective inputs and outputs and are arranged in a ring topology, such that an input of each of the logic units is coupled to an output of another of the logic units. Each of the logic units includes respective processing logic, which is identical to and operates in synchrony with the processing logic of the other logic units to process respective data values using at least one secret value stored in the device. The logic units are coupled, at an initial cycle of the device, to receive respective input values that are mutually uncorrelated. At subsequent cycles of the device, each of the logic units receives and operates on intermediate values that are output by another of the logic units.

20 Claims, 4 Drawing Sheets

(56) References Cited

OTHER PUBLICATIONS

Goodwill, Gilbert et al. "A testing methodology for side-channel resistance validation"; Cryptography Research, Inc.; 2001; available on the web at: http://www.cryptography.com/public/pdf/a-testing-methodology-for-side-channel-resistance-validation.pdf.

Jaffe, Josh, "First-Order DPA Attack Against AES in Counter Mode w/Unknown Counter", Cryptography Reasearch, Inc.; CHES 2007; available on the web at: http://www.cryptography.com/public/pdf/AESCounterModeAttack.pdf.

Jaffe, Josh, "A First-Order DPA Attack Against AES in Counter Mode w/Unknown Initial Counter", Cryptography Reasearch, Inc., 2007; available on the web at: http://www.cryptography.com/public/pdf/AESCounterAttackPaper.pdf.

Jaffe, Josh, "DPA Attacks vs. unknown input: a 1st-order Attack on Counter Modes", Rump Session Talk, CHES 2006; Cryptography Reasearch, Inc. avaiable on the web at: http://www.cryptography.com/public/pdf/DPA_Attacks.pdf.

Jaffe, Josh et al, "Efficient side-channel testing fror public key algorithms: RSA study", Cryptography Research, Inc.,2011, available on the web at: http://www.cryptography.com/public/pdf/efficient-side-channel-testing-for-public-key-algorithms-rsa-case-study.pdf.

Jun, Benjamin et al, "Is Your Mobile Device Radiating Keys?", Cryptography Reasearch, Inc.; ID: MBS-401; RAS Conference 2012; available on the web at: http://www.cryptography.com/public/pdf/2012-Jun-Kenworthy-MobileDeviceLeakage.pdf.

Kenworthy, Gary et al, "Mobile Device Security: The case for side channel resistance", Cryptography Research, Inc., 2012, available on the web at: http://www.cryptography.com/public/pdf/mobile-device-security-the-case-for-side-channel-resistance.pdf.

Kocher, Paul, "Design and Validation Strategies for Obtaining Assurance in Countermeasures to Power Analysis and Related Attacks": Cryptography Research, Inc:, 2005, available on the web at: http://www.cryptography.com/public/pdf/DPAValidation.pdf.

Kocher, Paul C., "Timing Attacks on Implementations of Diffie-Hellman, RSA, DSS, and other Systems". Cryptography Reasearch, Inc., 1996 available on the web at: http://www.cryptography.com/public/pdf/TimingAttacks.pdf.

Kocher, Paul et al, "Differential Power Analysis", Cryptography Research, Inc., 1998, available on the web at http://www.cryptography.com/public/pdf/DPA.pdf.

Kocher, Paul et al, "Introduction to Differential Power Analysis and Related Attacks", Cryptography Research, Inc. 1998, available on the web at: http://www.cryptography.com/public/pdf/DPATechInfo.pdf.

Kocher, Paul et al, "Introduction to differential power analysis", Cryptography Research, Inc., 2010, available on the web at: http://www.cryptography.com/public/pdf/IntroToDPA.pdf.

Kocher, Paul et al, "Self-Protecting Digital Content"—A Technical Report from the CRI Content Security Research Initiative; Cryptography Research, Inc., 2003, available on the web at: http://www.cryptography.com/public/pdf/SelfProtectingContent.pdf.

Rohatgi, Pankaj, "Leakage resistant encryption and decryption in Hardware Security Solution". Cryptography Research, Inc., 2011, available on the web at: http://www.cryptography.com/public/pdf/leakage-resistant-encryption-and-decryption.pdf.

Rohatgi, Pankaj, "Protecting FPGAs from Power Analysis"—Cryptography Research Whitepaper, 2010, available on the web at: http://www.cryptography.com/public/pdf/FPGASecurity.pdf.

Licensed Countermeasures: Cryptography Research, Inc., 2015, avaibale on the web at: http://cryptography.com/technology/dpa/licensed-countermeasures.html.

PCT Application No. PCT/IB2015/054508; International Search Report and Written Opinion, Sep. 30, 2015.

\* cited by examiner

DIFFERENTIAL POWER ANALYSIS COUNTERMEASURES

TECHNICAL FIELD

The present disclosure relates to cryptographic devices.

BACKGROUND

Increasingly, electronic devices implement cryptographic techniques to protect sensitive data. An electronic device may comprise a secure, embedded system (e.g., hardware and/or software) that protects sensitive data utilized by the electronic device according to encryption standards. For example, an electronic device (e.g., a smart card, mobile device, television unit, etc.) may be configured to perform encryption to encrypt sensitive data or to perform decryption to decrypt encrypted sensitive data. Encryption or decryption may be in accordance with the Advanced Encryption Standard (AES), a Data Encryption Standard (DES) or other cyphers. Cryptography typically use keys to encrypt and decrypt data, and these keys are generally known only to the device(s) performing the cryptographic techniques. It is important to ensure that these keys are not easily detectable by unauthorized people including computer hackers and cyber attackers.

DESCRIPTION OF EXAMPLE EMBODIMENTS

Overview

Figure 1:
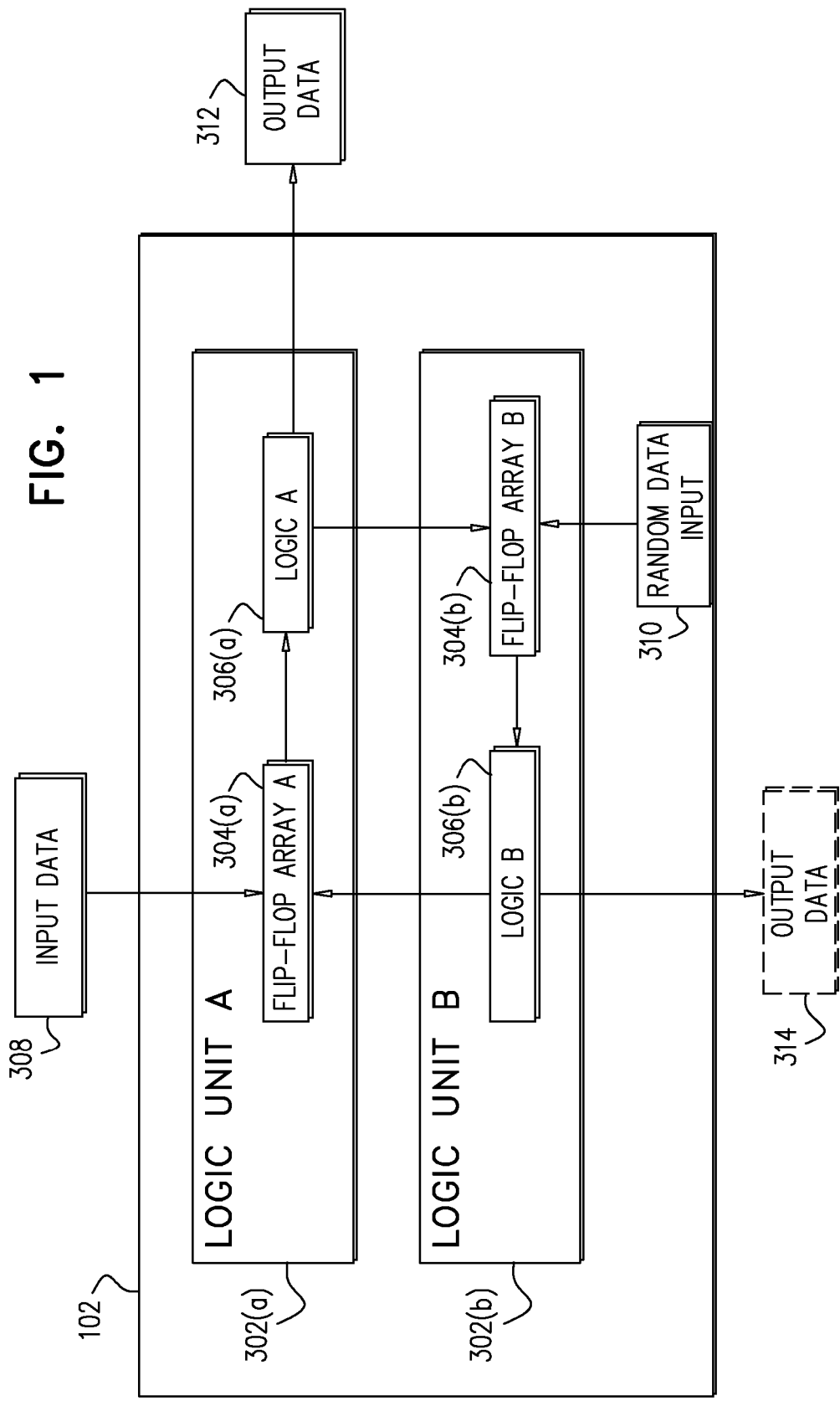
FIG. 1 shows an example system comprising a cryptographic device with two logic units for enhanced cryptography.

Embodiments described hereinbelow provide an electronic device, comprising a plurality of logic units, which are arranged in a ring topology. The term "ring topology," as used herein and as illustrated in the embodiments that follow, means that the input of each of the logic units is coupled to the output of another of the logic units. Each of the logic units comprises respective processing logic, which is identical to and operates in synchrony with the processing logic of the other logic units. The processing logic in each of the logic units processes, at each cycle, a respective data value using at least one secret value stored in the device. At the initial cycle of the device, the logic units receive different, respective input values that are mutually uncorrelated. At each subsequent cycle, each of the logic units receives and operates on an intermediate value that has been output by another of the logic units, until an output value is generated after a certain number of cycles.

In the disclosed embodiments, the electronic device comprises a device input, which is coupled to receive a first input value, and a device output. A logic core, comprising at least first and second logic units, is coupled to the device input so as to receive and process this first input value and, ultimately, to provide the output value at the device output. The logic core comprises an input generator, which provides at least one second input value that is uncorrelated with the first input value, and is typically inaccessible outside the device. The first logic unit comprises a first logic input, which is coupled to receive the first input value from the device input, and first processing logic configured to operate on first data values provided by the first logic input using the secret value. The second logic unit comprises a second logic input, which is coupled to receive the second input value from the input generator, and second processing logic identical to the first processing logic and configured to operate, in synchrony with the first processing logic, on second data values provided by the second logic input.

The use of the two (or more) logic units in a ring topology to process different, uncorrelated values synchronously, using identical processing logic, as provided by the disclosed embodiments, is useful in foiling attacks based on differential power analysis (DPA). Because only the first input value can be chosen externally, any relationship between the chosen input value and power consumption due to bit transitions in one of the logic units will be masked by the interleaving of uncorrelated values due to the other input values. Therefore, the attacker's attempts to find a correlation between input values and power consumption, and thus find the secret value held in the device, will fail.

Typically, the input generator comprises a random data generator, such that the second input value is a random value. Alternatively, other sources of second input values may be used, as long as they are uncorreated with the first input value and inaccessible to attackers.

As noted above, in the disclosed embodiments, the output of each logic unit feeds the input of another logic unit. In some embodiments, the second logic input is coupled to receive the second input value at an initial cycle of the device and to receive, at subsequent cycles of the device, first intermediate values generated by the first processing logic for processing by the second processing logic. At the same time, the first logic input may be coupled to receive the first input value at the initial cycle of the device and to receive, at the subsequent cycles of the device, second intermediate values generated by the second processing logic for processing by the first processing logic.

Alternatively, three or more logic units of this sort may be used. Such configurations are useful particularly in foiling higher-order DPA attacks. In one such embodiment, a third logic unit, comprising a third logic input, is coupled to receive second intermediate values generated by the second processing logic. Third processing logic, identical to the first and second processing logic, is configured to operate, in synchrony with the first and second processing logic, on third data values provided by the third logic input. The first logic input may be coupled to receive the first input value at the initial cycle of the device and to receive, at the subsequent cycles of the device, third intermediate values generated by the third processing logic for processing by the first processing logic.

The second processing logic (and processing logic in other logic units, if present) may be configured to operate on the second data values using the same secret value as the first processing logic or using another secret value, different from the secret value used by the first processing logic.

Example Embodiments

The techniques presented herein relate to enhanced encryption and decryption for cryptographic devices. In particular, these techniques enable enhanced cryptography for cryptographic devices.

The term "cryptographic device" as used herein defines an electronic device that is configured to perform encryption operations and/or decryption operations (referred to generally as "cryptographic operations"). After receiving the input data, a cryptographic device may encrypt the input data and generate as output data cipher data, also referred to as "cipher text." Alternatively or additionally, a cryptographic device may receive cipher text and decrypt the cipher text to generate the original input data. These encryption and decryption techniques are described in more detail hereinafter.

In general, the cryptographic device performs encryption and/or decryption techniques by utilizing an encryption/decryption algorithm and a secret key (referred to hereinafter as a "key"). For encryption scenarios, the key is used by the cryptographic device to cipher or encrypt the input data in accordance with an encryption algorithm to create the cipher text. Likewise, for decryption scenarios, the key is used by the cryptographic device to decipher or decrypt the cipher text in accordance with a decryption algorithm. For example, the key may be a 256 bit (32 byte) key that is configured to perform the encryption and/or decryption operations in accordance with an encryption/decryption algorithm (also referred to hereinafter as "algorithm" for simplicity). Examples of algorithms include the Advanced Encryption Standard (AES), Data Encryption Standard (DES), etc. In other words, for encryption techniques, the input data is received by the cryptographic device, and the key is used to encrypt the input data using an algorithm. In this example, the cryptographic device outputs the cipher text after the encryption, and the cipher text is an encrypted version of the input data. The input data may be, for example, a 32 byte input and the cipher text may be a 32 byte encrypted version of the input data. Likewise, for decryption techniques, the cipher text is received by the cryptographic device, and the key is used to decrypt the cipher text using a cryptographic algorithm, e.g., AES or DES. After decrypting the cipher text, the cryptographic device outputs the original input data.

The key is an important aspect of maintaining the security of the cryptographic operations performed by the cryptographic device. In general, in order for an outside party to undermine the encryption/decryption techniques performed by the cryptographic device, the outside party must know the key and the algorithm used by the cryptographic device. Often, the algorithm used by the cryptographic device is known or easy to guess or readily available. For example, the cryptographic device may use AES or DES as the cryptographic algorithm, and the definition of the AES and DES algorithms may be publically available to the outside party. Because the key is not publically available to the outside party, even if the outside party has information about the type of cryptography being performed, the outside party is unable to decrypt the cipher text and cannot encrypt the input data. Thus, the secrecy of the key is essential for maintaining the security of the encryption and decryption operations.

An outside party (e.g., an "attacker"), however, may target the cryptographic device to attempt to obtain or learn a key contained therein. The attacker may use several techniques to try to obtain the key of the cryptographic device. For example, as stated above, the key may be a 256 bit key, and the attacker may attempt to use a "brute force" technique to guess the correct key value. However, this "brute force" approach would be computationally difficult for the attacker, as the attacker would have to guess the correct 256 bit key combination out of 225 possibilities. In another approach, the attacker may attempt to guess the key in bit segments. For example, the attacker may attempt to guess the key in 8-bit segments (e.g., key bytes), thereby reducing the number of possibilities to 8192 ($2^8*(256/8)$). From the attacker's perspective, it is advantageous to attempt to guess the key in bit segments, as the number of possible samples is significantly less than the brute force approach.

There are several known techniques that an attacker may use to attempt to obtain the key of the cryptographic device. For example, in a so-called power analysis technique, the attacker can supply input data to the cryptographic device, and the attacker can measure the power dissipated by the cryptographic device as the cryptographic device performs the cryptographic operations. More specifically, the cryptographic device comprises integrated circuits which are built out of individual transistors. The transistors, e.g., operate as voltage-controlled switches and current flows across the transistors when electrical charge is applied to or removed from the gates of the transistors. The current then delivers electrical charge to the gates of other transistors, interconnections and other circuit loads. The motion of the electric charge consumes power and produces electromagnetic radiation, both of which are detectable by an outside entity. Thus, with appropriate equipment, the attacker can measure electrical behaviors of the cryptographic device such as the power dissipated by the cryptographic device over time (e.g., over a period of clock cycles) as the cryptographic device performs the cryptographic operations. The attacker can utilize these measurements to attempt to determine the key of the cryptographic device.

In general, the hardware design of the cryptographic device includes, e.g., data registers, commonly implemented as flip-flop arrays, and other logical elements. The logical elements perform logical operations on data. For example, the logical elements may perform a sequence of logical operations such as "AND," "OR," "XOR," etc. operations. Thus, a series of logical elements is referred to as "combinational logic." Every combinational logic receives its inputs from flip-flop array(s) that are used to store data, and the output of a combinational logic at every clock cycle is stored to flip-flop arrays. A combinational logic together with an input flip-flop array is referred to hereinafter as a "logic unit" or a "multi-state logic unit." The cryptographic device may have one or more logic units. For example, as will become apparent herein, the cryptographic device may have two or more logic units that are identical copies of each other and that are logically equivalent. These logic units provide enhanced cryptography for the cryptographic device, as described by the techniques herein.

In one example, at every clock cycle, the input data is modified in a logic unit by one of the combinational logic of the cryptographic device and stored to flip-flop arrays as a part of a cryptographic operation (e.g., encryption). For example, as described in more detail hereinafter, at a first clock cycle, the input data is modified (as a part of the cryptographic operation) in a first logic unit by a first one of the combinational logic and stored in a first set of flip-flop arrays, and at a subsequent clock cycle, the modified input data is sent from the first logic unit to a second logic unit and is modified in the second logic unit by a second combinational logic and stored in a second set of flip-flop arrays as a part of the cryptographic operation. The process continues for many clock cycles until the cryptographic operation is complete. In general, when the input data is modified in a logic unit, one or more gates of the devices in the combinational logic may change state. For example, when the input data is modified by one of the combinational logic, gates of one or more devices in the combinational logic may change its state from an "off" state to an "on" state or more simply, from a "0" state to a "1" state. As the gates change state, the cryptographic device consumes power.

As stated above, it is possible for an outside entity to monitor a power consumption profile (e.g., "power profile") of the cryptographic device. The power profile of the cryptographic device describes the power consumption of the cryptographic device over a period of time (e.g., over a period of clock cycles) for a given input. An outside entity, such as an attacker, supplies input data ("input data A") to the cryptographic device and the attacker measures the power consumed by the cryptographic device over a period of clock cycles to obtain a power profile ("power profile A"). Power profile A comprises a series of power measurements at different time intervals that correspond to clock cycles of the cryptographic device. For example, when the cryptographic device performs an encryption/decryption operation on input data A, the cryptographic device consumes a certain amount of power over time, represented by power profile A, that can be measured by the attacker. Power profile A is unique to the input data, and different input data will result in different power profiles. The attacker may supply another input data ("input data B") to obtain another power profile ("power profile B"), and so on. By obtaining multiple power profiles while knowing the input data, the attacker can attempt to guess the key of the cryptographic device using power analysis techniques. For example, the attacker can assume that the overall power consumption of the cryptographic device is related to the number of gates that change in a combinational logic during a cryptographic operation.

One power analysis technique is known as Simple Power Analysis (SPA). In SPA attacks, the attacker analyzes the power profiles and assumes that the amount of power consumed by the cryptographic device varies depending on the microprocessor instructions performed by the cryptographic device. In other words, the attacker may identify from the power profiles features of AES operations by assuming that different encryption/decryption operations consume different amounts of power. For example, the attacker may use the SPA analysis to reveal differences between multiplication and squaring operations performed by the cryptographic device to perform the encryption/decryption techniques. However, the attacker who uses SPA to attempt to obtain the key relies on visual inspection of the power profiles to identify relevant power fluctuations. SPA attacks, therefore, can be deterred by adding noise to the power profiles.

For a more aggressive attack, the attacker may use another type of power analysis called Differential Power Analysis (DPA). DPA relies on a statistical analysis of multiple power profiles, and thus, DPA attacks are more powerful than SPA attacks since random noise alone in the power profiles may not undermine a DPA attack. DPA attacks, however, are more time-consuming than SPA attacks. In a typical DPA attack, the attacker supplies a series of input data and obtains a corresponding series of power profiles. The attacker attempts to guess the key of the cryptographic device by guessing segments of the key at a time. For ease of explanation, in this example, the attacker may guess the key in 8-bit segments at a time. The attacker makes several assumptions when performing the DPA attack. First, the attacker assumes that the cryptographic device is using a particular cryptographic standard, for example, AES. Additionally, the attacker assumes a particular value for the 8-bit segment of the key that the attacker is attempting to determine.

For example, when attempting to use DPA to obtain a key, the attacker assumes that the cryptographic device is performing AES encryption and also assumes a first value for the 8-bit key segment of interest. The attacker uses the assumed value of the 8-bit key segment, and based on the assumed AES encryption standard, for every given input data, the attacker is able to simulate a part of the expected intermediate results of an encryption operation performed by the cryptographic device. That is, for every input, the attacker can simulate expected partial intermediate outcomes that would result if the input undergoes AES encryption using the assumed 8-bit key value. The expected partial intermediate outcomes are called "intermediate values," and these outcomes are intermediate results of a simulated AES encryption on the input with the assumed 8-bit key value. For example, Table 1, below, shows an example list of simulated expected outcomes of the AES encryption with the assumed 8-bit key value.

TABLE 1

Simulated AES encryption with intermediate results for a first assumed key value

| Experiment | $x_5$ | $y_5 = x_5 \oplus k_5 =$ $x_5 \oplus 0x17$ | $z_5 = 5(y_5)$ | Hamming Distance $(y_5, z_5)$ |
|---|---|---|---|---|
| 1 | 0x38 | 0x2F | 0x15 | 4 |
| 2 | 0x85 | 0x92 | 0x4F | 6 |
| 3 | 0xE7 | 0xF0 | 0x8C | 5 |
| ... | ... | ... | ... | ... |

For example, the attacker may be attempting to determine the fifth byte of the key (e.g., the fifth 8-bit key segment). The attacker assumes that at some clock cycle the input to the S-box (marked as $y_5$ in Table 1) is at some gates, and the output from the S-box (marked as $z_5$ in Table 1) is at the same gates at the next clock cycle, and thus the values in Table 1 reflect the relevant portions of the AES encryption that are simulated by the attacker to try and determine the fifth byte of the key. All of the simulated outcomes shown in Table 1 are for the same key value assumption for the fifth byte of the key. In other words, the attacker assumes that the fifth byte of the key has some value (that the attacker guesses), and the attacker simulates a series of AES encryptions for this key value assumption. Table 1 shows the simulated AES encryption for a guessed fifth byte key value $k_5$. The attacker then makes another guess for the fifth byte of the key, and runs another simulation based on this assumption. Ultimately, the attacker attempts to determine which key value assumption is correct. By repeating this analysis for all of the bytes of the key, the attacker can ultimately obtain the entire key of the cryptographic device.

For example, in Table 1, the input data of the first experiment is shown at value "$x_5$" to represent a fifth byte of the overall input data. The value $x_5$ is shown, in an example, as a hexadecimal value "0x38," which corresponds to the binary value "00111000," as one with ordinary skill in the art will recognize. Since the attacker knows the input value $x_5$ (since he provides it), and since the attacker is assuming that the cryptographic device is performing AES encryption, the attacker can simulate intermediate values $y_5$ and $z_5$ for the key byte assumption $k_5$. For example, in AES encryption, the $x_5$ byte of the input data may be XORed with the fifth byte of the key of the cryptographic device (shown as $k_5$ in Table 1).

As stated above, the attacker makes an assumption for the key value of $k_5$, and thus, the attacker is able to simulate the values of the XOR operation to determine the expected intermediate value $y_5$ for the given input $x_5$. For example, in Table 1, the intermediate value $y_5$ is shown as a hexadecimal value "0x2F," which corresponds to the binary value "00101111." The attacker is also able to determine the expected intermediate value $z_5$ which may result under AES, for example, from a byte-to-byte "S-box" function on $y_5$. In Table 1, the intermediate value $z_5$ is shown, in an example, as hexadecimal value "0x15," which corresponds to binary value "00010101." Thus, as shown in Table 1, the attacker knows the input data $x_5$ (that he supplies to the cryptographic device), and the attacker can generate the intermediate values $y_5$ and $z_5$ of an AES encryption operation for an assumed key value $k_5$ (that he assumes). The attacker can also calculate a Hamming distance between the intermediate value $y_5$ and the intermediate value $z_5$. The Hamming distance between the intermediate values represents the number of bits that are different between $z_5$ and $y_5$.

Thus, for the first experiment, the Hamming distance between the intermediate value $y_5$ and the intermediate value $z_5$ is four (i.e., the number of bits that are different between "00101111" and "00010101"). The attacker repeats this process for different input data and obtains a series of results corresponding to different input data. Thus, for n inputs, the attacker can obtain n Hamming distance values. Each of the Hamming distance values corresponds to the number bits that are different between intermediate values $y_5$ and $z_5$ for each given input. These n Hamming distance values correspond to a single key assumption for $k_5$, and as stated above, the attacker will perform different simulations for different key assumptions that he makes for $k_5$. Thus, for every key assumption for $k_5$, the attacker can obtain a series of n Hamming distance values, each of which corresponds to a particular input data.

Ultimately, with the information in Table 1, the attacker will attempt to verify whether or not the key assumption $k_5$ for the series of input data is correct. In order to make this determination, the attacker assumes that the power consumption during a clock cycle is correlated to the number of gates that have changed their state in the cryptographic device. In other words, the attacker assumes that the cryptographic device is performing a cryptographic operation using a combinational logic, and the attacker assumes that the power consumption of the cryptographic device is correlated to the Hamming distance between the states of the gates in the combinational logic before and after a clock cycle. In other words, the attacker assumes, for example, that at one clock cycle, the gates in a combinational logic of a first logic unit are in one set of states to perform the cryptographic operation at that clock cycle, and at a second clock cycle the gates in the same combinational logic are in another set of states to perform the cryptographic operation at that next clock cycle.

When the cryptographic device is designed and operates in accordance with the techniques described herein, however, at the second clock cycle, another (identical) combinational logic of a second logic unit may be performing the cryptographic operation instead of the initial logic unit, while the calculations at the same gates in the initial combinational logic pertain to another calculation with inputs unknown to the attacker. Thus, the number of gates that change in the initial combinational logic of the first logic unit at consecutive clock cycles may not be correlated to Hamming distance values. That is, the attacker assumes that the intermediate values represent intermediate values in the same combinational logic at consecutive clock values. Thus, the attacker has n Hamming distance values for the n input data that represent the differences between intermediate values, and thus the attacker attempts to use the Hamming distance measurements to determine whether or not it is correlated with the power consumption at consecutive clock cycles.

For example, as shown in Table 2 below, for every key segment assumption, the attacker may generate an n×m table. The rows in Table 2 represent each of the n inputs for the given key segment assumption. The columns in Table 2 represent power measurements at a particular clock cycle.

TABLE 2

Power Profile for each of n inputs for m clock cycles

|  | Clock cycle 1 | Clock cycle 2 | Clock cycle 3 | Clock cycle 4 | Clock cycle m |
|---|---|---|---|---|---|
| Input 1 | $P_{1,1}$ | $P_{1,2}$ | $P_{1,3}$ | $P_{1,4}$ | $P_{1,m}$ |
| Input 2 | $P_{2,1}$ | $P_{2,2}$ | $P_{2,3}$ | $P_{2,4}$ | $P_{2,m}$ |
| Input 3 | $P_{3,1}$ | $P_{3,2}$ | $P_{3,3}$ | $P_{3,4}$ | $P_{3,m}$ |
| Input n | $P_{n,1}$ | $P_{n,2}$ | $P_{n,3}$ | $P_{n,4}$ | $P_{n,m}$ |

Each entry in Table 2 represents a power consumption measurement obtained by the attacker. For example, the entry $P_{n,m}$ represents the power consumed by the cryptographic device for input n at clock cycle m. Also, as described above in connection with Table 1, for every input n, the attacker can generate (by offline calculation) a Hamming distance value between intermediate values of an assumed encryption technique. Thus, as shown in Table 3, for every key segment assumption, the attacker can generate a 1×n array of Hamming distance values for each of n inputs.

TABLE 3

Hamming Distance for key segment $k_5$ showing power profile for each of n inputs for m clock cycles

| Input | Hamming Distance |
|---|---|
| Input 1 | $H_1$ |
| Input 2 | $H_2$ |
| Input 3 | $H_3$ |
| Input n | $H_n$ |

Each value in Table 3 represents a Hamming distance calculation between intermediate values for a given input. The attacker may generate an n×1 array of Hamming distances for every key segment assumption. As stated above, the attacker may attempt to verify the accuracy of a key segment guess by correlating Hamming distance values with power measurements. The attacker assumes in Table 2 that a power value at a given clock cycle represents how many gates have changed state in a combinational logic from an immediately prior clock cycle. Thus, for example, at clock cycle 2 for input 1, the attacker assumes that the intermediate value $y_5$ appears in a first combinational logic and that the intermediate value $z_5$ appears in the same combinational logic. In actuality, when the techniques described herein are used, at the second clock cycle, the intermediate value $z_5$ appears in another (identical) combinational logic. Thus, at clock cycle 2, the attacker assumes that the power value $P_{1,2}$ is related to how many gates have changed in the first combinational logic from the immediately prior clock cycle (e.g., clock cycle 1). In other words, the attacker assumes that the power value $P_{1,2}$ is related to the Hamming distance between $y_5$ and $z_5$. Since the attacker has n power measurements for clock cycle 2, and since the attacker has n Hamming distance values (for each of the n inputs, as shown in Table 3), the attacker performs a correlation between the n×1 Hamming distance array in Table. 3 and the n×1 column representing clock cycle 2. If any of the correlation values are statistically significant, the attacker knows that the guessed key portion $k_5$ is correct. If the correlation between the n×1 Hamming distance array and the n×1 column representing clock cycle 2 does not return any statistically significant result, the attacker runs a correlation on the other clock cycle columns. Thus, the attacker obtains m correlation values for each key segment guess. Each of the m correlation values describes a correlation between the n×1 Hamming distance array and the n×1 column for a particular clock cycle. If any of the m correlation values are statistically significant, the attacker assumes that the guess for key segment $k_5$ is correct. If not, the attacker repeats the above operations for other key segment guesses (e.g., generates Table 1, Table 2 and Table 3 and determines the m correlation values for each key segment guess, as described above) and other hypotheses about which intermediate values appear at the same gates at consecutive clock cycles.

As stated above, in order to correctly guess the key segment using the Hamming distance correlation technique, the attacker assumes that intermediate values appear in the same combinational logic of the same logic unit at consecutive clock cycles. However, the present techniques undermine this central assumption, and accordingly, in the techniques described herein, the attacker may not be able to correctly guess the key segment using the Hamming distance correlation technique. The techniques described herein, thus, are designed to thwart an attack that utilizes Hamming distance correlation techniques (e.g., DPA attacks). According to the techniques described herein, if the intermediate values are swapped between different instances of identical combinational logic of different logic units at consecutive clock values, the attacker may be unable to rely on Hamming distance correlation techniques to determine key segment values.

Reference is now made to FIG. 1, which shows a cryptographic device enhanced particularly in order to foil DPA attacks. The cryptographic device in FIG. 1 comprises a device input 308, which receives an input value, and a device output 312, which outputs data generated by a logic core 102. The logic core comprises multiple logic units 302, including a first logic unit 302(a) ("logic unit A") and a second logic unit 302(b) ("logic unit B"). As stated above, each logic unit comprises a logic input, which may comprise one or more flip-flop arrays 304, and processing logic, such as combinational logic 306, which operates on data values provide by the respective logic input using a secret value, such as a cryptographic key (not shown in the figures) that is stored in logic core 102. The different logic units 302(a) and 302(b) may use the same secret value or different, respective secret values.

Figure 2:
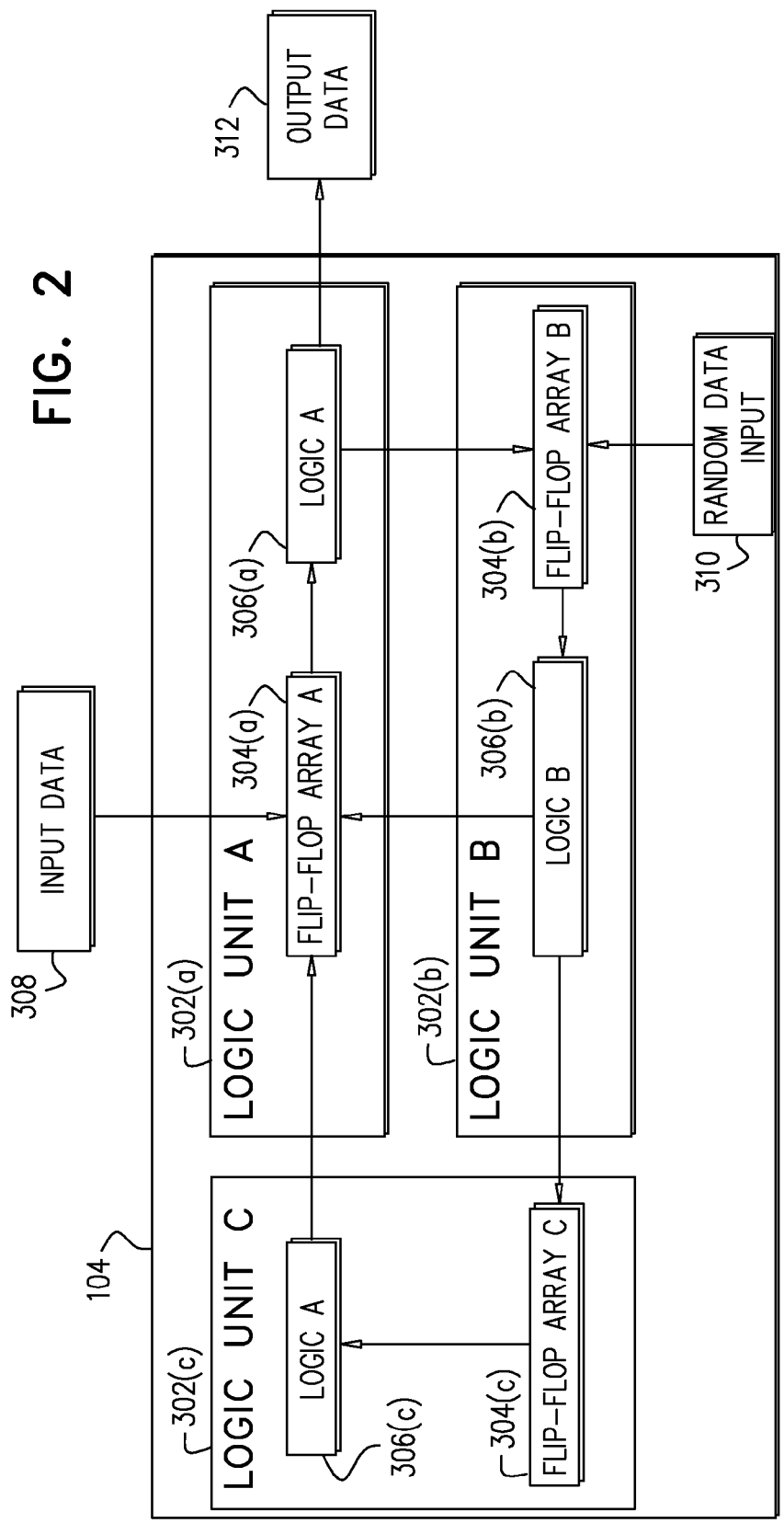
FIG. 2 shows an example system comprising a cryptographic device with three logic units for enhanced cryptography.

For example, logic unit A is depicted as having a first flip-flop array 304(a) ("flip-flop array A") and a first combinational logic 306(a) ("combinational logic A"). Likewise, logic unit B is depicted as having a second flip-flop array 304(b) ("flip-flop array B") and a second combinational logic 306(b) ("combinational logic B"). At each operating cycle of core 102, the output of logic 306(a) feeds intermediate values to array 304(b) at the input of logic unit B, while the output of logic 306(b) feeds intermediate values to array 304(a) at the input of logic unit A. It should be appreciated that logic unit A and logic unit B may comprise any number of logic elements, and furthermore, that logic core 102 may comprise more than two logic units of this sort, which may be advantageously arranged in the ring topology that is shown in FIGS. 1 and 2. Logic unit A and logic unit B are copies of one another. In other words, logic unit A and logic unit B are functionally and logically identical to each other. Also, it should be appreciated that logic unit A and logic unit B operate in synchrony, i.e., perform concurrent calculations of identical types, wherein the input data for each logic unit is different at each clock cycle, as described herein.

For example, as shown in FIG. 1 at reference numeral 308, at a first clock cycle, input data is supplied via device input 308 (from a legitimate source or by an attacker) to logic unit A of the cryptographic device. Similarly, as shown in FIG. 1, an input generator, such as a random number generator 310, provides another input at the first clock cycle, unknown to the attacker. Generator 310 provides data that is uncorrelated with input 308, such as random or pseudo-random data, as input to logic unit B. Optionally, logic unit B may feed a device output 314, in addition to or instead of device output 312, depending on the device configuration and application requirements.

Ordinarily, in implementations that are known in the art, logic unit A would perform cryptographic operations on the input data at the first clock cycle and also at the second clock cycle, third clock cycle, etc. In other words, in existing implementations, logic unit A has a feedback loop to itself to perform cryptographic operations on the input data at every clock cycle. Contrary to such existing implementations, the techniques described herein enable enhanced cryptography by using different operations performed by the cryptographic device. As shown in FIG. 1, at the first clock cycle, logic unit A performs cryptographic operations on the data from input 308 at the first clock cycle. Likewise, at the first clock cycle, logic unit B performs operations on the random data input provided by input generator 310. Data generator 310 provides data values unrelated to the input data at input 308. At the second clock cycle, output data generated by logic unit A is sent from logic unit A to logic unit B. In other words, the output node ("output node A") of the logic unit A operates as the input node ("input node B") of logic unit B. Logic unit B performs cryptographic operations on the input data (the same cryptographic operations that would have been performed by logic unit A at the second clock cycle, since logic unit B is a copy of logic unit A). Likewise, at the second clock cycle, the output data generated by logic unit B is sent to logic unit A. That is, the output node ("output node B") of logic unit B operates as the input node ("input node A") of logic unit A. Logic unit A performs operations on the random data input. At a third clock cycle, the input data is sent from logic unit B to logic unit A, and logic unit A again performs cryptographic operations on the input data, while the random data input is sent from the logic unit A to logic unit B, and logic unit B again performs operations on the random data input. The process continues until the cryptographic operation on the input data is complete, and the result is output via device output 312 or 314.

The following is an example to demonstrate the effectiveness of the techniques described herein in foiling a DPA attack. In an example, in implementations that are known in the art, in which logic unit A feeds back to itself to perform cryptographic operations, gates at logic unit A at the first clock cycle may be in states "0 0 1" after performing the cryptographic operations on the input data, and at a second clock cycle, the gates at logic unit A may be in states "1 0 0" after again performing cryptographic operations on the input data. Thus, at consecutive clock cycles, the gate changes in logic unit A (e.g., the changes from "0 0 1" to "1

0 0") reflect changes in the intermediate results of the cryptographic operation since logic unit A is the only logic unit performing cryptographic operations on the input data. Thus, the attacker would be able to use Hamming distance correlation techniques effectively by assuming that the power measurements are related to the gate state changes in consecutive clock cycles.

However, in this same example, according to the techniques presented herein, gates at logic unit A at the first clock cycle may be in states "0 0 1" after performing the cryptographic operation on the input data received via input 308, and gates in the logic unit B at the first clock cycle may be in states "1 1 1" after performing operations on the random data provided by input generator 310. At the second clock cycle, the gates at logic unit A may be in states "1 1 0" after performing operations on the random data input, and the gates at logic unit B may be in states "1 0 0" after performing cryptographic operations on the input data. Thus, at consecutive clock cycles, the gate changes in logic unit A do not reflect chains in the intermediate results of the cryptographic operation. Instead, at consecutive clock cycles the gate changes in logic unit A change from "0 0 1" (cryptographic operation on input data) to "1 1 0" (operation on random data input). That is, logic unit A is not performing cryptographic operations on the input data at consecutive clock cycles. Thus, the attacker would not be able to use Hamming distance correlation techniques effectively, since the states of the gates of a logic unit at any two consecutive clock cycles pertain to different operations (i.e., cryptographic operations on the input data and operations on the random data input).

Thus, as depicted in Table 4 below intermediate values of the cryptographic operations are thus interleaved between logic unit A and logic unit B at consecutive clock cycles. In Table 4, the "0" and "1" values depict portions of the intermediate values that the attacker can calculate based on the known input and the assumed key value. The "x" values depict values that the attacker cannot predict. As shown in Table 4, the attacker may be able to determine at most certain portions of the intermediate values.

TABLE 4

Intermediate values interleaved between encryption sequences

| | Intermediate value at logical unit A | Intermediate value at logical unit B |
| --- | --- | --- |
| Clock cycle 1 | 01001101xxxxxxxx | xxxxxxxxxxxxxxxx |
| Clock cycle 2 | xxxxxxxxxxxxxxxx | 10001010xxxxxxxx |
| Clock cycle 3 | 11101001xxxxxxxx | xxxxxxxxxxxxxxxx |
| Clock cycle 4 | xxxxxxxxxxxxxxxx | 10010100xxxxxxxx |
| Clock cycle 5 | 10100101xxxxxxxx | xxxxxxxxxxxxxxxx |
| Clock cycle 6 | xxxxxxxxxxxxxxxx | 00101101xxxxxxxx |
| Clock cycle 7 | 11000101xxxxxxxx | xxxxxxxxxxxxxxxx |
| Clock cycle m | xxxxxxxxxxxxxxxx | 10000001xxxxxxxx |

It should be appreciated, however, that the techniques described herein do not increase the number of clock cycles required to perform the cryptographic operations. Although the cryptographic operations are interleaved between logic unit A and logic unit B at consecutive clock cycles, logic unit A and logic unit B are both performing cryptographic operations on the input data (since logic unit A and logic unit B are identical). In other words, logic unit A and logic unit B alternate performing cryptographic operations on the input data at every clock cycle.

FIG. 2 shows a cryptographic device comprising a logic core 104 that is designed to provide enhanced cryptography to thwart higher order DPA attacks. Logic core 104 in FIG. 2 comprises logic unit A at 302(*a*), logic unit B at 302(*b*) and a third logic unit at 302(*c*) ("logic unit C"). It should be appreciated that the cryptographic device in FIG. 2 may comprise even four or more logic units of this sort. In FIG. 2, logic unit A comprises flip-flop array A and combinational logic A. Logic unit B comprises flip-flop array B and combinational logic B, labeled with the same indicator numbers as in FIG. 1. Logic unit C comprises flip-flop array 304(*c*) ("flip-flop array C") and a third combinational logic 306(*c*) ("combinational logic C"). In FIG. 2, the cryptographic operations may be interleaved among these three logic units, wherein all three logic units are identical to one other (e.g., functionally and logically equivalent). As shown in FIG. 2, the output node of logic unit A operates as the input node of logic unit B. The output node of logic unit B operates as the input node of logic unit C. The output node of logic unit C operates as the input node for logic unit A. At a first clock cycle, logic unit A performs cryptographic operations on the input data, logic unit B performs cryptographic operations on the input data at a second clock cycle and logic unit C performs cryptographic operations on the input data at the third clock cycle. Each of the logic units may perform operations on random data during the clock cycles at which it is not performing cryptographic operations on the input data. (An additional input generator, not shown in the figure, may provide uncorrelated input to logic unit C at the initial cycle of operation.) This implementation can be extended to n logic units to protect against n-order DPA attacks.

Figure 3:
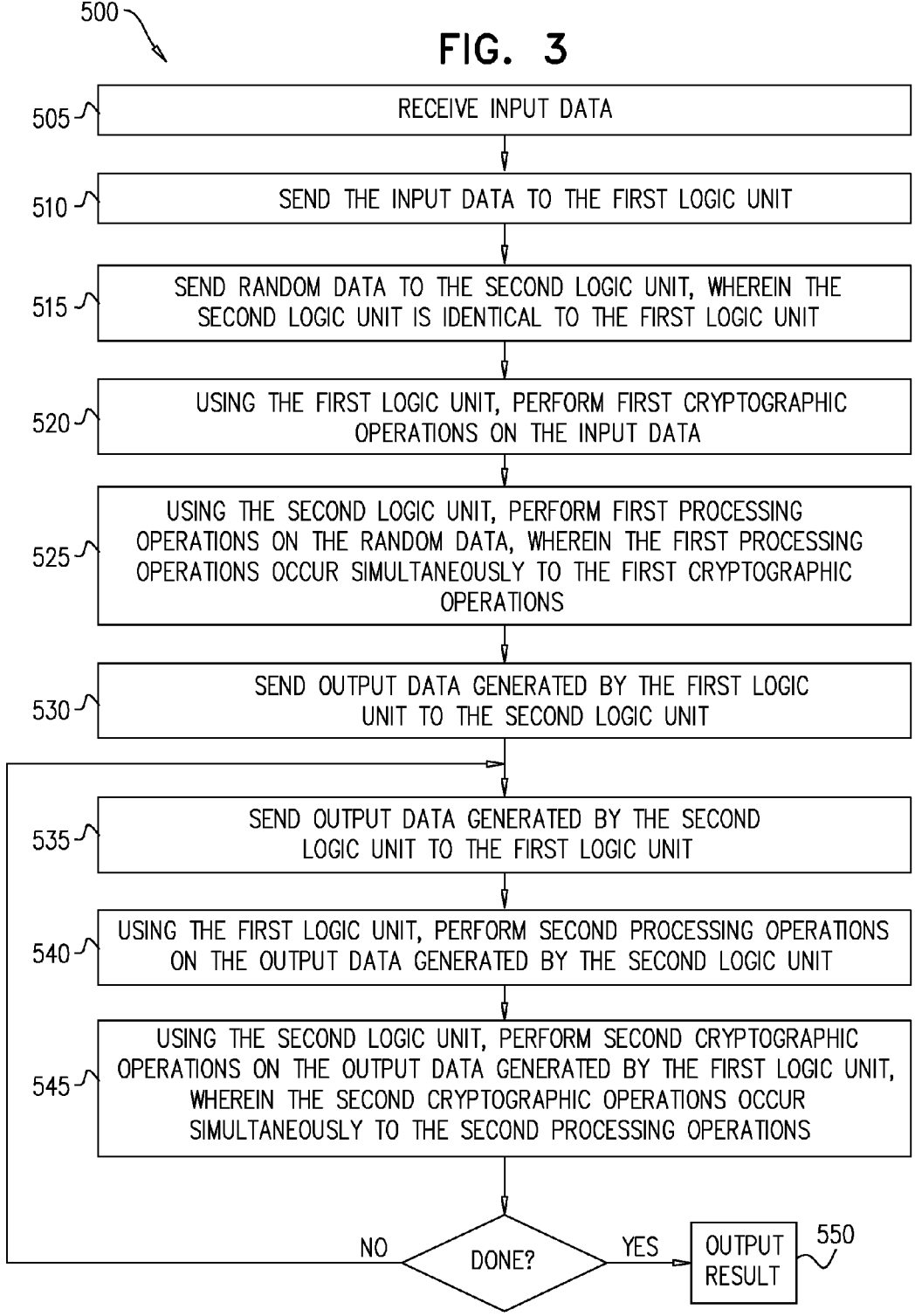
FIG. 3 shows an example flow chart depicting operations of a cryptographic device implementing enhanced cryptography.

Reference is now made to FIG. 3, which shows an example flow chart 500 depicting operations of a cryptographic device in implementing enhanced cryptography. At operation 505, the cryptographic device receives input data, and at operation 510, the input data is sent to a first logic unit. At operation 515, random data is sent to a second logic unit, wherein the second logic unit is identical to the first logic unit. Using the first logic unit, at operation 520, the cryptographic device performs first cryptographic operations on the input data. Using the second logic unit, at operation 525, the cryptographic device performs first processing operations on the random data. The first processing operations occur synchronously with the first cryptographic operations. At 530, output data generated by the first logic unit is sent to the second logic unit, and at 535, output data generated by the second logic unit is sent to the first logic unit. At 540, using the first logic unit, the cryptographic device performs second processing operations on the output data generated by the second logical unit. Using the second logic unit, at operation 545, the cryptographic device performs second cryptographic operations on the output data generated by the first logic unit. The second cryptographic operations occur in synchrony with the second processing operations. If the operations are now done, the cryptographic device outputs the result at 550. Otherwise, the operations continue from 530 through as many additional iterations are required, until done.

Figure 4:
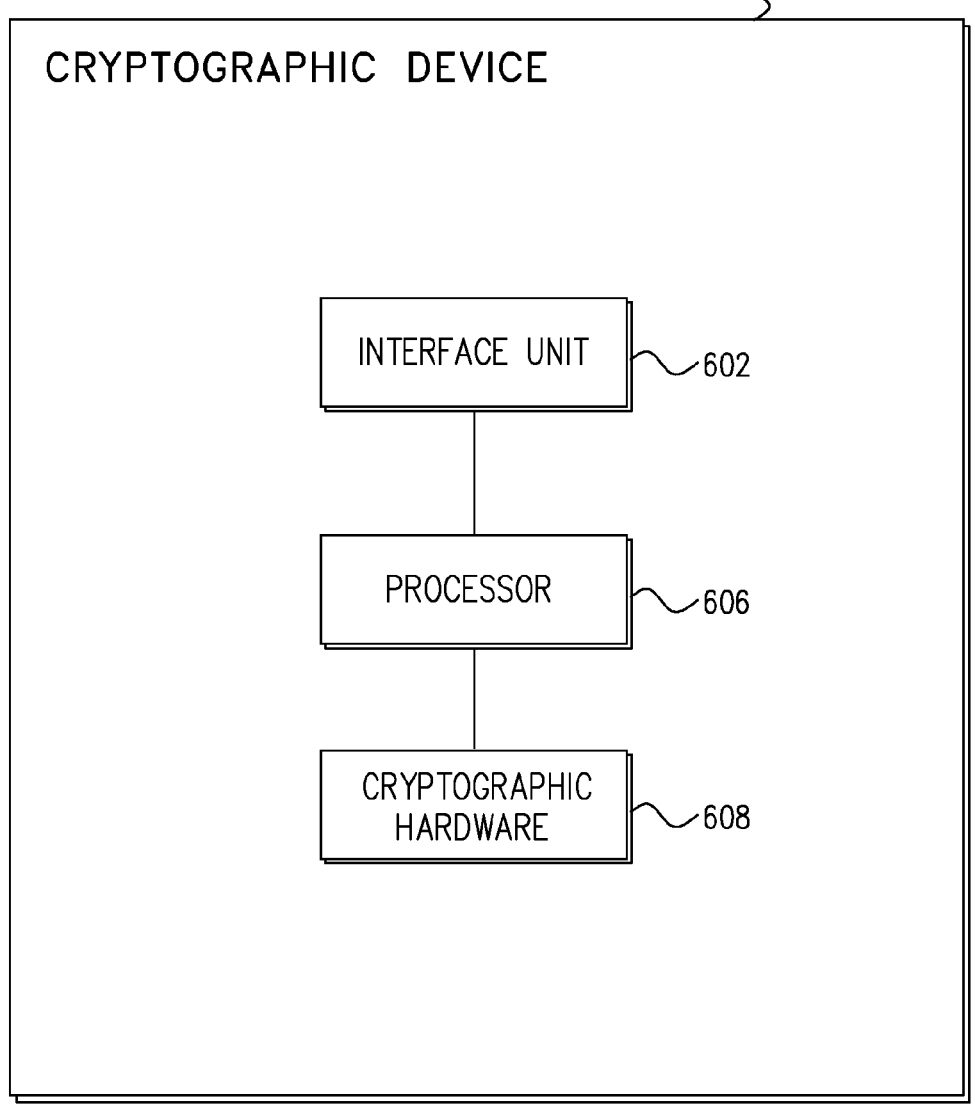
FIG. 4 shows an example block diagram of cryptographic device configured to implement enhanced cryptography.

Reference is now made to FIG. 4, which shows an example block diagram of the cryptographic device 600 configured to implement enhanced cryptography. The cryptographic device 600 comprises an interface unit 602, cryptographic hardware 608 and a processor 606. The interface unit 602 is configured to receive input data and is configured to output cipher text. The cryptographic hardware 608 comprises a logic core, such as core 102 or 104, which comprises a plurality of cryptographic logic units (e.g., two or more of logic unit A, logic unit B, logic unit C, etc.), as described hereinabove. The interface unit 602 and the cryptographic hardware are coupled to the processor 606. The processor 606 is a microprocessor or microcontroller that is configured to execute program logic instructions for carrying out various operations and tasks described herein. For example, the processor 606 may cause hardware 608 to perform the enhanced cryptography techniques described herein. The functions of processor 606 may be implemented by logic encoded in one or more tangible computer readable media (e.g., embedded logic such as an application specific integrated circuit, digital signal processor instructions, software that is executed by a processor, etc.)

In summary, a method is provided comprising: in an electronic device configured to perform cryptography, receiving input data; sending the input data to a first logic unit; sending random data to a second logic unit, wherein the second logic unit is identical to the first logic unit; using the first logic unit, performing first cryptographic operations on the input data; using the second logic unit, performing first processing operations on the random data, wherein the first processing operations occur in synchrony with the first cryptographic operations; sending output data generated by the first logic unit to the second logic unit; sending output data generated by the second logic unit to the first logic unit; using the first logic unit, performing second processing operations on the output data generated by the second logic unit; and using the second logic unit, performing second cryptographic operations on the output data generated by the first logic unit, wherein the second cryptographic operations occur in synchrony with the second processing operations. These operations may be repeated iteratively as many times as required to give the desired cryptographic result.

In addition, an apparatus is provided comprising: a first logic unit comprising a first flip-flop array and a first combinational logic; and a second logic unit configured identically to the first logic unit and comprising a second flip-flop array and a second combinational logic, wherein an output node of the first logic unit is configured to operate as an input node of the second logic unit such that output from the first logic unit is input to the second logic unit and wherein an output node of the second logic unit is configured to operate as an input node of first logic unit such that output of the second logic unit is input to the first logic unit.

Furthermore, an apparatus is provided comprising: a first logic unit comprising a first flip-flop array and a first combinational logic; a second logic unit configured identically to the first logic unit and comprising a second flip-flop array and a second combinational logic; and a third logic unit configured identically to the first logic unit and comprising a third flip-flop array and a third combination logic, wherein: an output node of the first logic unit is configured to operate as an input node of the second logic unit such that output from the first logic unit is input to the second logic unit; an output node of the second logic unit is configured to operate as an input node of the third logic unit such that the output from the second logic unit is input to the third logic unit; and an output node of the third logic unit is configured to operate as an input node of the first logic unit such that the output from the third logic unit is input to the first logic unit.

The above description is intended by way of example only. Various modifications and structural changes may be made therein without departing from the scope of the concepts described herein and within the scope and range of equivalents of the claims.

What is claimed is:

1. An electronic device, comprising:
a device input, coupled to receive a first input value;
a device output; and
a logic core, coupled to the device input so as to receive and process the first input value using a secret value stored in the logical core so as to provide an output value at the device output, the logic core comprising:
an input generator, configured to provide a second input value that is uncorrelated with the first input value; and
a plurality of logic units implemented in hardware, consisting essentially of:
a first logic unit, comprising a first logic input, which is coupled to receive, at an initial cycle of the device, the first input value from the device input and to receive, at subsequent cycles of the device, first intermediate values generated by another one of the logic units; and first processing logic configured to operate on first data values provided by the first logic input using the secret value, thereby generating second intermediate values; and
a second logic unit, comprising a second logic input, which is coupled to receive the second input value from the input generator at the initial cycle of the device and to receive, at subsequent cycles of the device, the second intermediate values; and second processing logic identical to the first processing logic and configured to operate, in synchrony with the first processing logic, on second data values provided by the second logic input, thereby generating further intermediate values for input to a further one of the logic units.

2. The device according to claim 1, wherein the input generator comprises a random data generator, such that the second input value is a random value.

3. The device according to claim 1, wherein the first logic input is coupled to receive, at the subsequent cycles of the device, the further intermediate values generated by the second processing logic, whereby the first intermediate values comprise the further intermediate values.

4. The device according to claim 1, wherein the plurality of the logic units comprises a third logic unit, comprising a third logic input, which is coupled to receive the further intermediate values generated by the second processing logic, and third processing logic identical to the first and second processing logic and configured to operate, in synchrony with the first and second processing logic, on third data values provided by the third logic input.

5. The device according to claim 4, wherein the first logic input is coupled to receive, at the subsequent cycles of the device, third intermediate values generated by the third processing logic for processing by the first processing logic, whereby the first intermediate values comprise the third intermediate values.

6. The device according to claim 1, wherein the second processing logic is configured to operate on the second data values using the same secret value as the first processing logic.

7. The device according to claim 1, wherein the second processing logic is configured to operate on the second data values using another secret value, different from the secret value used by the first processing logic.

8. A method, comprising: receiving, at a device input of a device comprising a plurality of logic units implemented in hardware, a first input value;
providing, in the device, a second input value that is uncorrelated with the first input value; and
processing the first and second input values in a logic core consisting essentially of a plurality of logic units, using a secret value stored in the device, so as to provide an output value at a device output of the device, wherein the plurality of the logic units consist essentially of:
a first logic unit, comprising a first logic input, which receives, at an initial cycle of the device, the first input value from the device input and receives, at subsequent cycles of the device, first intermediate values generated by another one of the logic units; and first processing logic operating on first data values provided by the first logic input using the secret value to generate second intermediate value; and
a second logic unit, comprising a second logic input, which receives the second input value at the initial cycle of the device and receives, at subsequent cycles of the device, the second intermediate values; and second processing logic identical to the first processing logic and operating in synchrony with the first processing logic on second data values provided by the second logic input to generate further intermediate values for input to a further one of the logic units.

9. The method according to claim 8, wherein providing the second input value comprises generating a random value.

10. The method according to claim 8, wherein processing the first and second input values comprises receiving, at the first logic input, at the subsequent cycles of the device, the further intermediate values generated by the second processing logic, whereby the first intermediate values comprise the further intermediate values.

11. The method according to claim 8, wherein the plurality of the logic units comprises a third logic unit, comprising a third logic input, which receives the further intermediate values generated by the second processing logic, and third processing logic identical to the first and second processing logic and operating in synchrony with the first and second processing logic, on third data values provided by the third logic input.

12. The method according to claim 11, wherein processing the first and second input values comprises receiving, at the first logic input, at the subsequent cycles of the device, third intermediate values generated by the third processing logic for processing by the first processing logic, whereby the first intermediate values comprise the third intermediate values.

13. The method according to claim 8, wherein processing the first and second input values comprises operating on the second data values in the second processing logic using the same secret value as the first processing logic.

14. The method according to claim 8, wherein processing the first and second input values comprises operating on the second data values in the second processing logic using another secret value, different from the secret value used by the first processing logic.

15. An electronic device, consisting essentially of a plurality of logic units implemented in hardware, which have respective inputs and outputs and are arranged in a ring topology, such that an input of each of the logic units is coupled to an output of another of the logic units,
wherein each of the logic units comprises respective processing logic, which is identical to and operates in synchrony with the processing logic of the other logic units to process respective data values using at least one secret value stored in the device,
wherein the logic units are coupled, at an initial cycle of the device, to receive respective input values that are mutually uncorrelated, and
wherein at subsequent cycles of the device, each of the logic units receives and operates on intermediate values that are output by another of the logic units.

16. The device according to claim 15, and comprising:
a device input, which is configured to receive a first input value for input to one of the logic units at the initial cycle; and
at least one input generator, which is configured to provide at least one second input value, uncorrelated with the first input value, for input to at least one other of the logic units.

17. The device according to claim 16, wherein the input generator is inaccessible from outside the device.

18. The device according to claim 16, wherein the at least one second input value comprises a random value.

19. The device according to claim 16, and comprising a device output, which is configured to provide an output value, depending on the first input value, after processing of the first input value by the logic units in the ring topology.

20. The device according to claim 15, wherein the plurality of the logic units comprises first and second logic units, having respective first and second inputs and outputs, wherein the first input is coupled to the second output and the second input is coupled to the first output.

* * * * *

UNITED STATES PATENT AND TRADEMARK OFFICE
CERTIFICATE OF CORRECTION

PATENT NO.         : 9,871,651 B2
APPLICATION NO.    : 14/607137
DATED              : January 16, 2018
INVENTOR(S)        : Yaacov Belenky It is certified that error appears in the above-identified patent and that said Letters Patent is hereby corrected as shown below:

On the Title Page

On Page 2, Other Publications, Column 1, Line 10, "Reasearch" to read as -- Research --.

On Page 2, Other Publications, Column 1, Line 15, "Reasearch" to read as -- Research --.

On Page 2, Other Publications, Column 1, Line 15, "avaiable" to read as -- available --.

On Page 2, Other Publications, Column 1, Line 23, "Reasearch" to read as -- Research --.

On Page 2, Other Publications, Column 2, Line 6, "Reasearch" to read as -- Research --.

In the Specification

Column 2, Line 29, "uncorreated" to read as -- uncorrelated --.

Column 3, Line 67, "225" to read as -- $2^{256}$ --.

Column 6, Line 26, in Table 1, "5(y5)" to read as -- $S(y_5)$ --.

Signed and Sealed this
Thirteenth Day of March, 2018

Andrei Iancu
*Director of the United States Patent and Trademark Office*